United States Patent
Takahashi

(10) Patent No.: US 10,296,807 B2
(45) Date of Patent: May 21, 2019

(54) IMAGE PROCESSING APPARATUS AND IMAGE PROCESSING METHOD

(71) Applicant: CANON KABUSHIKI KAISHA, Tokyo (JP)

(72) Inventor: Kosei Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/723,657

(22) Filed: Oct. 3, 2017

(65) Prior Publication Data

US 2018/0096220 A1   Apr. 5, 2018

(30) Foreign Application Priority Data

Oct. 4, 2016 (JP) ................... 2016-196728
Jul. 13, 2017 (JP) ................... 2017-137337

(51) Int. Cl.
| | | |
|---|---|---|
| G06T 11/00 | (2006.01) | |
| G06K 9/46 | (2006.01) | |
| H04N 1/60 | (2006.01) | |
| H04N 1/407 | (2006.01) | |
| G09G 3/20 | (2006.01) | |
| H04N 5/243 | (2006.01) | |
| G06T 5/00 | (2006.01) | |
| H04N 5/235 | (2006.01) | |
| H04N 9/04 | (2006.01) | |
| H04N 9/64 | (2006.01) | |

(52) U.S. Cl.
CPC ............ *G06K 9/4661* (2013.01); *G06T 5/009* (2013.01); *G06T 11/001* (2013.01); *G09G 3/2003* (2013.01); *H04N 1/4072* (2013.01); *H04N 1/6027* (2013.01); *H04N 5/2351* (2013.01); *H04N 5/243* (2013.01); *H04N 9/045* (2013.01); *H04N 9/64* (2013.01); *G06T 2207/10024* (2013.01); *G09G 2340/06* (2013.01)

(58) Field of Classification Search
CPC ........ G06K 9/4661; H04N 9/045; H04N 9/64; H04N 5/2351; H04N 1/6027; H04N 5/243; H04N 1/4072; G06T 5/009; G06T 11/001; G06T 2207/10024; G09G 3/2003; G09G 2340/06
See application file for complete search history.

(56) References Cited

FOREIGN PATENT DOCUMENTS

JP   2015-159543 A   9/2015

*Primary Examiner* — Christopher Wait
(74) *Attorney, Agent, or Firm* — Carter, DeLuca & Farrell LLP

(57) ABSTRACT

To decide an efficient tone-conversion characteristic by which it is possible to reduce tone loss while suppressing the occurrence of a visual tone gap, an image processing apparatus that decides a tone-conversion characteristic for converting an M level input image into an N level output image, the apparatus decides a maximum d at which a difference between a luminance value Y(i) corresponding to an ith level of the input image and a luminance value Y(i+d) corresponding to an (i+d)th level does not exceed a given threshold; and sets, based on the d decided by the decision unit, the tone-conversion characteristic so that the ith level and the (i+d)th level of the input image respectively correspond to a jth level and a (j+1)th level of the output image.

12 Claims, 15 Drawing Sheets

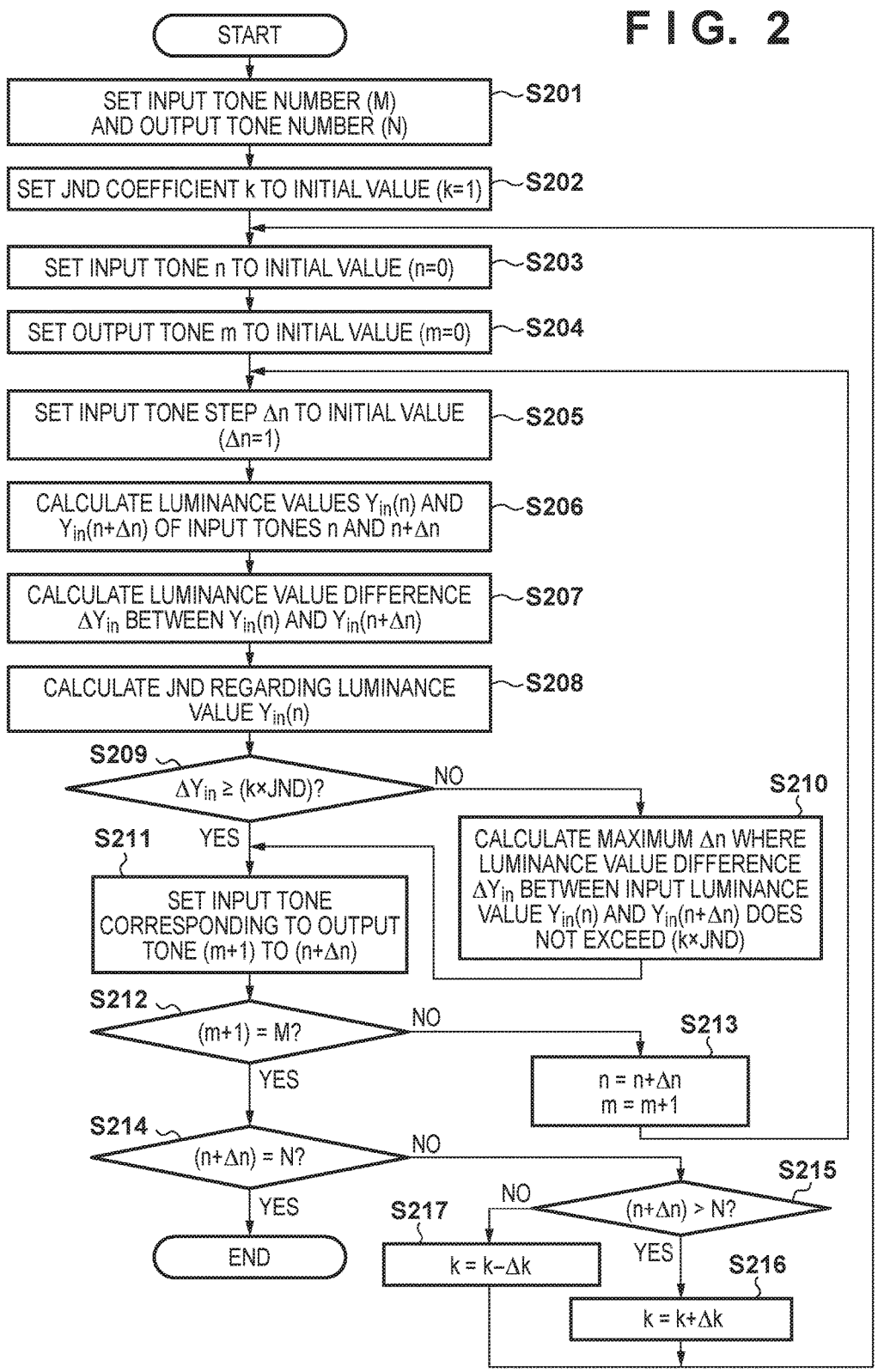

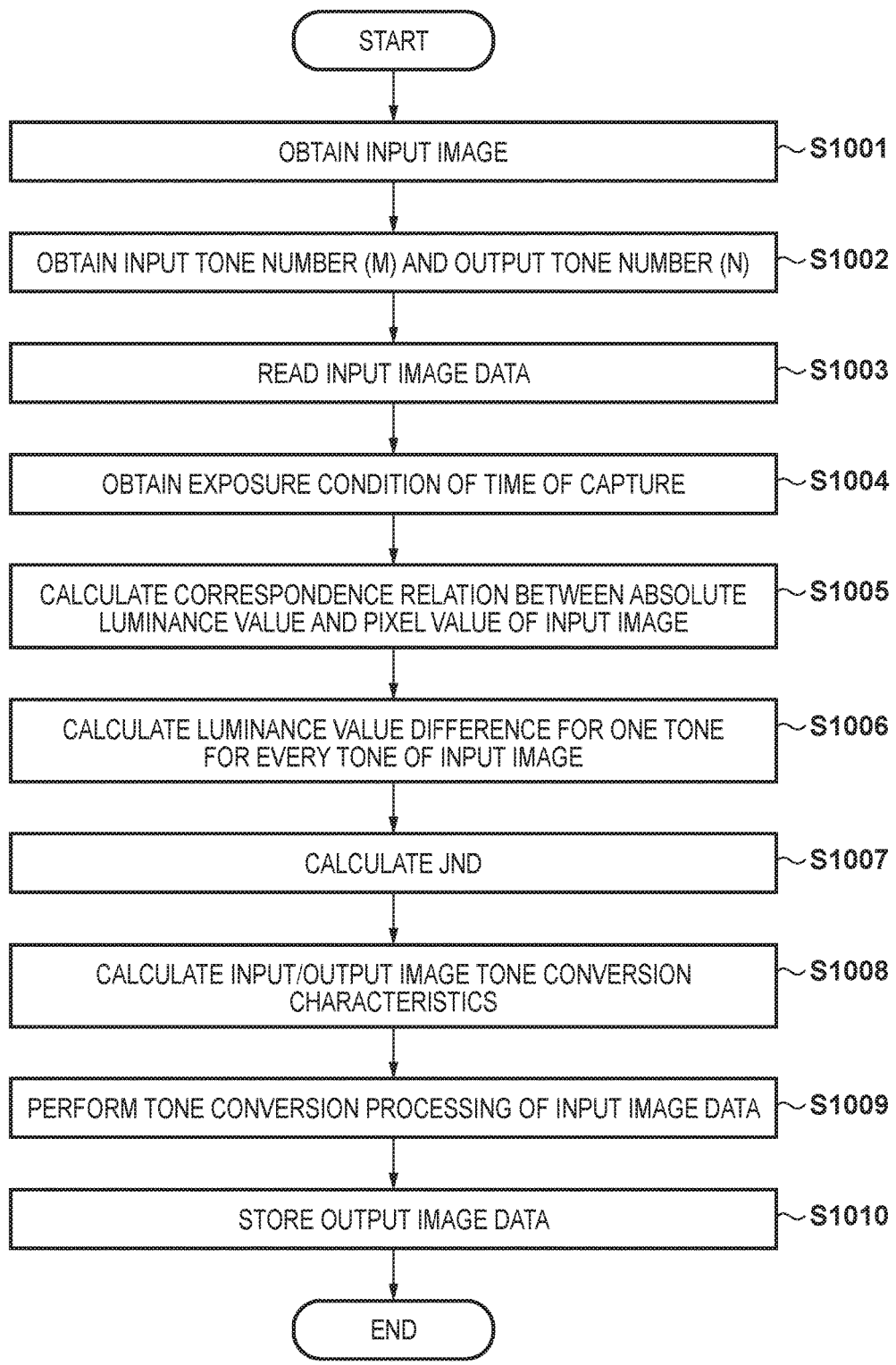

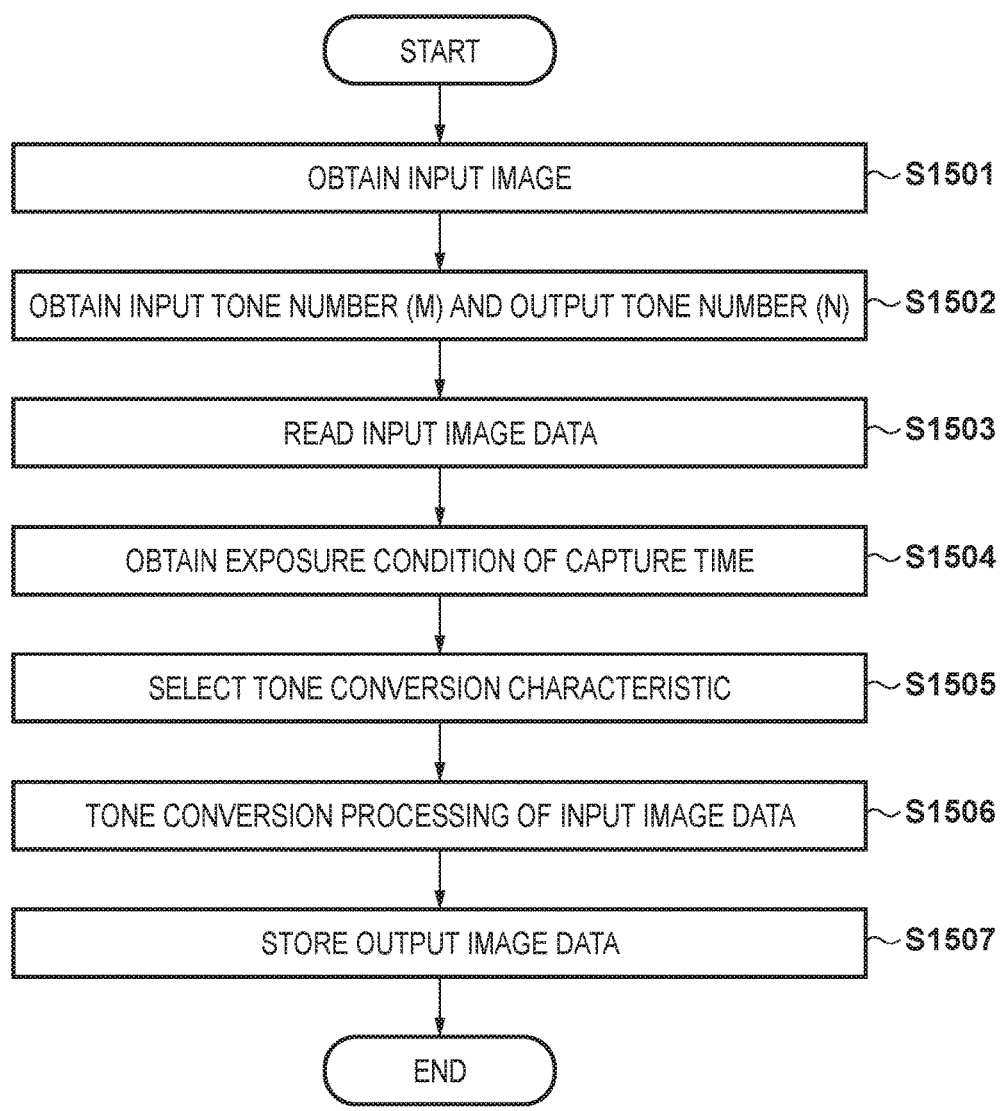

IMAGE PROCESSING APPARATUS AND IMAGE PROCESSING METHOD

BACKGROUND OF THE INVENTION

Field of the Invention

The present invention relates to image tone conversion processing.

Description of the Related Art

In recent years, in image input devices such as a digital camera, a dynamic range (hereinafter described as D range) which is a luminance range that can be captured is increasing. Typically, the number of bits necessary for recording and transmitting captured image data increases in conjunction with an increase in the captured D range. For example, in a case where a luminance-linear image of a D range of 100:1 is recorded, it is normally sufficient that the number of bits for 1 pixel is 8 bits (=256 levels). However, in the case of increasing the D range to 10000:1, a minimum of 14 bits (=15384 levels) is necessary.

A technique of quantizing an image by a smaller number of bits since the data amount of a wider D range image is larger has been proposed. For example, in Japanese Patent Laid-Open No. 2015-159543 (patent literature 1), a technique which is called JND (Just Noticeable Difference) and in which non-linear quantization is performed considering the luminance discrimination capabilities of a human has been disclosed. Specifically, a method of performing quantization for which tone gaps do not visually arise by fine quantization in dark luminance regions and coarse quantization in bright luminance regions has been disclosed.

However, in the foregoing technique according to patent literature 1, since the quantization bit number or the like in an AD conversion of an actual image device (for example, an image sensor) is not considered, the technique is not necessarily optimized to the image device to be used.

SUMMARY OF THE INVENTION

According to one aspect of the present invention, an image processing apparatus that decides a tone-conversion characteristic for converting an M level input image into an N level output image (where M>N), the apparatus comprises: a decision unit configured to decide a maximum d (where d is a positive integer) at which a difference between a luminance value Y(i) corresponding to an ith level of the input image and a luminance value Y(i+d) corresponding to an (i+d)th level does not exceed a given threshold; and a setting unit configured to, based on the d decided by the decision unit, set the tone-conversion characteristic so that the ith level and the (i+d)th level of the input image respectively correspond to a jth level and a (j+1)th level of the output image.

According to another aspect of the present invention, an image processing apparatus that decides a tone-conversion characteristic for converting an M level input image into an N level output image (where M>N), the apparatus comprising: a first setting unit configured to, in a luminance range of luminances smaller than a predetermined luminance threshold, set the tone-conversion characteristic so that an ith level and an (i+1)th level of the input image respectively correspond to a jth level and a (j+1)th level of the output image; and a second setting unit configured to, in a luminance range of luminances greater than or equal to the predetermined luminance threshold, decide a maximum d (where d is a positive integer greater than or equal to 2) at which a difference between a luminance value Y(i) corresponding to an ith level of the input image and a luminance value Y(i+d) corresponding to an (i+d)th level does not exceed a given threshold, and set the tone-conversion characteristic so that the ith level and the (i+d)th level of the input image respectively correspond to a jth level and a (j+1)th level of the output image.

The present invention provides a technique that enables more suitable image tone conversion.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flowchart illustrating processing of the image processing apparatus in the first embodiment.

FIG. 10 is a flowchart illustrating processing of the image processing apparatus according to the third embodiment.

FIG. 15 is a flowchart illustrating processing of the image processing apparatus in the fourth embodiment.

DESCRIPTION OF THE EMBODIMENTS

Explanation is given in detail below, with reference to the drawings, of suitable embodiments of the invention. Note, the following embodiments are only examples and are not intended to limit the scope of present invention.

First Embodiment

A first embodiment of an image processing apparatus according to the present invention is described below using an example of an image processing apparatus that performs a tone conversion (tone compression) of an M-level input image into an N-level (where M>N) output image.

<Apparatus Configuration>

Figure 1:
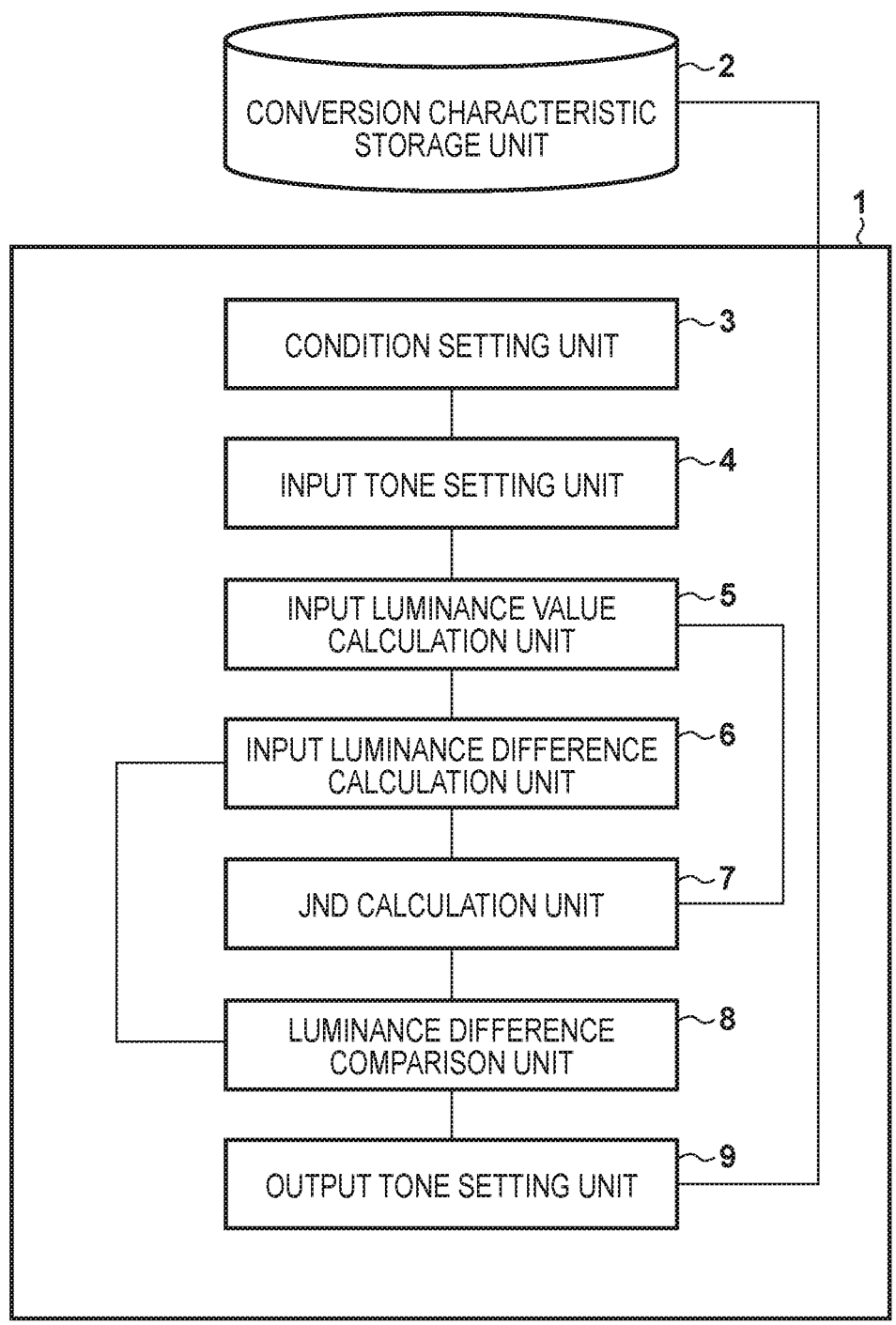
FIG. 1 is a block diagram illustrating a configuration of an image processing apparatus according to a first embodiment.

FIG. 1 is a block diagram illustrating a configuration of an image processing apparatus according to a first embodiment. As described above, an image processing apparatus 1 is an apparatus that calculates a tone-conversion characteristic for converting an input image represented by M levels into an output image of N levels. Also, a conversion characteristic storage unit 2 is an apparatus for storing the tone-conversion characteristic that the image processing apparatus 1 calculated, specifically an input tone value and an output tone value corresponding to the input tone value.

A condition setting unit 3 sets a condition in a tone-conversion characteristic calculation. An input tone setting unit 4 sets an input tone value that is to be the target of calculation. An input luminance value calculation unit 5 calculates a luminance value corresponding to an input tone value that is set. An input luminance difference calculation unit 6 calculates a luminance difference for one tone in input tone values. A JND calculation unit 7 calculates a JND which is a luminance difference that can be discriminated in luminance values corresponding to input tone values.

A luminance difference comparison unit 8 compares a luminance difference for one tone for an input tone which is calculated by the input luminance difference calculation unit 6 and a JND calculated by the JND calculation unit 7. For example, it determines a magnitude relation. An output tone setting unit 9 sets an output tone value corresponding to an input tone value on the basis of the comparison result in the luminance difference comparison unit 8.

<Apparatus Operation>

FIG. 2 is a flowchart illustrating processing of the image processing apparatus in the first embodiment.

In step S201, the condition setting unit 3 performs a setting of an input tone number and an output tone number which are conditions necessary for calculation of a tone-conversion characteristic. Here, the input tone number is set to M and the output tone number is set to N (where M>N). In step S202, the condition setting unit 3 sets the initial value of a JND coefficient k (coefficient decision unit). Here, k=1 is set.

In step S203, the input tone setting unit 4 sets an initial value of a target input tone value n (ith level) which is for calculating the tone-conversion characteristic. Here, n=0 is set. In step S204, the output tone setting unit 9 sets an initial value of an output tone value m corresponding to the initial value of the input tone value (n=0). Here, m=0 is set. In step S205, the input tone setting unit 4 sets an initial value (a positive integer d) of an input tone step $\Delta n$. Here, $\Delta n$=1 is set.

In step S206, the input luminance value calculation unit 5 calculates luminance values $Yin(n)$ and $Yin(n+\Delta n)$ for cases in which the input tone values are n and $(n+\Delta n)$. In step S207, a luminance difference calculation unit 6 calculates a luminance difference $\Delta Yin$ between the input luminance values $Yin(n)$ and $Yin(n+\Delta n)$ by using the following Equation (1).

$$\Delta Y_{in} = \frac{Yin(n+\Delta n) - Yin(n)}{\{Yin(n+\Delta n) + Yin(n)\}/2} \times 100 \quad (1)$$

In step S208, the JND calculation unit 7 calculates a JND value, which is a value obtained by using a predetermined function on the luminance value, for the luminance value $Yin(n)$ in a case where the input tone value is n. The details of the calculation are described later.

In step S209, the luminance difference comparison unit 8 compares a luminance difference $\Delta Yin$ calculated in step S207 and a given threshold ($k \times JND$) which is a value resulting from multiplying the coefficient k set in step S202 with the JND calculated in step S208. At this time, if the value of $\Delta Yin$ is greater than or equal to ($k \times JND$), the processing proceeds to step S211, and if not, the processing proceeds to step S210. In step S210, the output tone setting unit 9 repeatedly increases the value of $\Delta n$, and when a maximum $\Delta n$ value at which a luminance difference $\Delta Yin$ between the luminance values $Yin(n)$ and $Yin(n+\Delta n)$ does not exceed the given threshold ($k \times JND$) is calculated, the processing proceeds to step S211. In step S211, the output tone setting unit 9 sets the input tone value corresponding to the output tone value (m+1) to ($n+\Delta n$), and stores it in the conversion characteristic storage unit 2. Specifically, it sets so that the ith level and the (i+d)th level in the input image correspond respectively to the jth level and the (j+1)th level of the output image.

In step S212, the output tone setting unit 9 determines whether or not the output tone value (m+1) reached the maximum value M for output tone values. If the maximum value M is reached, the processing proceeds to step S214, and if it is not reached, the input tone values n and m are changed in step S213 to the values ($n+\Delta n$) and (m+1) respectively, and the processing returns to step S205.

In step S214, the input tone setting unit 4 determines whether the input tone value is the same as the value N set in step S201, and ends the processing if they are the same, and if not, the processing proceeds to step S215. In step S215, if the value of ($n+\Delta n$) is greater than N, the processing proceeds to step S216, and if it is smaller than N, the processing proceeds to step S217.

In step S216, the condition setting unit 3 updates the coefficient k by a value resulting from adding the value ($\Delta k$) set in advance to the value of the JND coefficient k, and the processing returns to step S203. In step S217, the condition setting unit 3 updates the coefficient k by a value resulting from subtracting the value ($\Delta k$) set in advance to the value of the JND coefficient k, and the processing returns to step S203.

<JND Calculation Method>

A human vision model for calculating a minimum luminance difference (JND) that can be discriminated in relation to a particular luminance value is known. For example, in a model called Weber's law, a JND ($\Delta Y$) corresponding to a particular luminance value Y is obtained by a ratio therewith, and is modeled by Equation (2).

$$\frac{\Delta Y}{Y} = \text{constant} \quad (2)$$

In Equation (2), by setting an appropriate value to constant (which is a constant), it is possible to calculate a JND corresponding to a luminance value Y.

Meanwhile, the JND calculation method is not limited to the foregoing calculation method using Weber's law. For example, there is a method of calculating from a visual contrast sensitivity called a Barten model. The visual contrast sensitivity according to the Barten model is modeled by Equation (3).

$$S(L, u) = \frac{1}{m_t} = \frac{M_{opt}(u)/k}{\sqrt{\frac{2}{T}\left(\frac{1}{X_0^2} + \frac{1}{X_{max}^2} + \frac{u^2}{N_{max}^2}\right)\left(\frac{1}{\eta pE} + \frac{\Phi_0}{1 - e^{-(u/u_0)^2}}\right)}} \quad (3)$$

$$M_{opt}(u) = e^{-2\pi^2 \sigma^2 u^2}$$

$$\sigma = \sqrt{\sigma_0^2 + (C_{ab}d)^2}$$

$$d = 5 - 3\tanh(0.4\log((LX_0^2/40^2)))$$

$$E = \frac{\pi d^2}{4}L(1 - (d/9.7)^2 + (4/12.4)^4)$$

Here, each parameter is set as follows, for example.

Figure 3A:
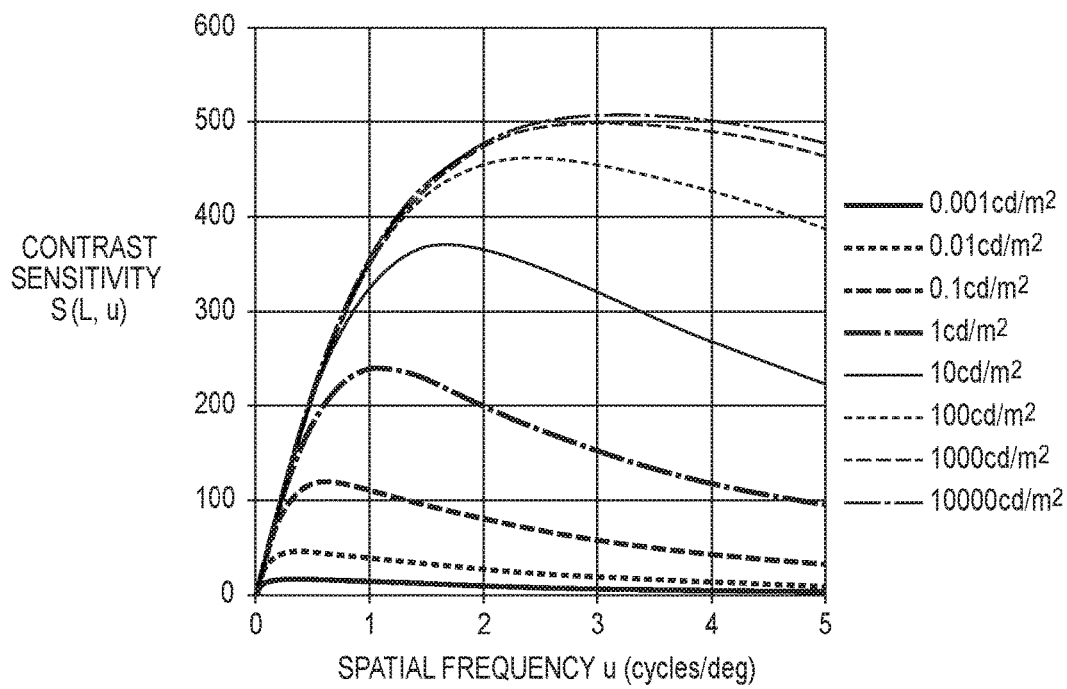
FIG. 3A and FIG. 3B are views for describing a JND calculation that is based on a Barten model.
Figure 3B:
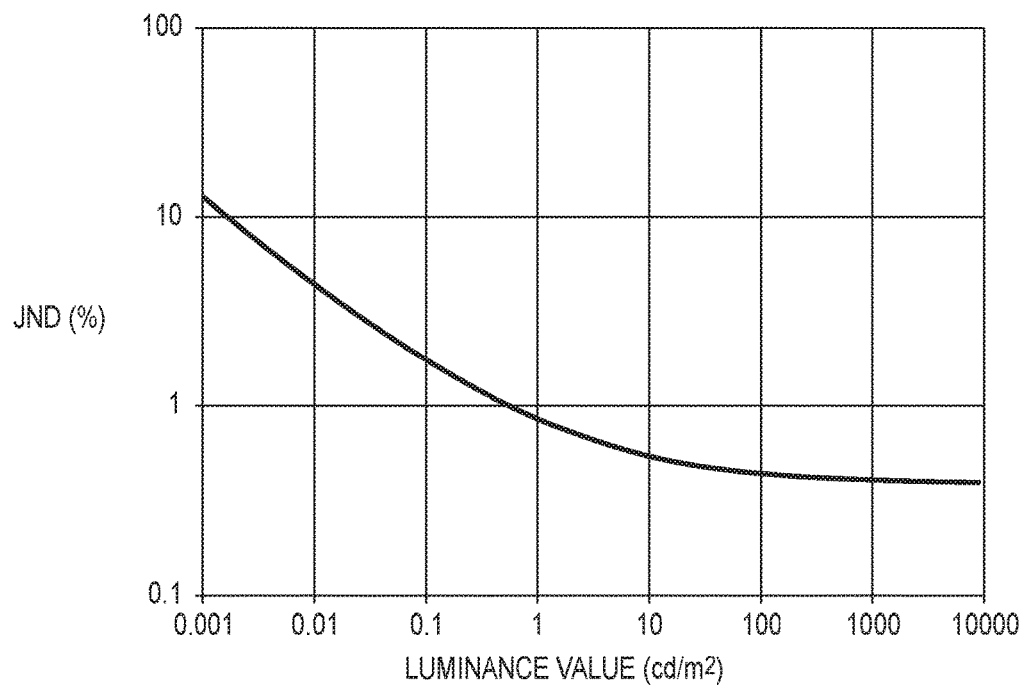

$k = 3.0$ $\sigma_0 = 0.5$ arc min $C_{ab} = 0.08$ arc min/mm $T = 0.1$ sec $X_{max} = 12°$ $N_{max} = 15$ cycles $\eta = 0.03$ $\Phi_0 = 3 \times 10^{-8}$ sec deg$^2$ $u0 = 7$ cycles/deg $p = 1.2 \times 10^6$ photons/sec/deg $^2$/Td FIG. 3A and FIG. 3B are views for describing a JND calculation that is based on the Barten model. From Equation (3), as illustrated in FIG. 3A, a visual contrast sensitivity $S(L, u)$ at each luminance value and spatial frequency is calculated. There is also a method of calculating a JND at an arbitrary luminance value as illustrated in FIG. 3B by using the spatial frequency at which the contrast sensitivity is highest, and by calculating a reciprocal of the contrast sensitivity at this time, as illustrated in Equation (4). Specifically, any human vision model can be used if it is a method by which a JND value can be calculated at a required accuracy.

$$JND(L) = \frac{1}{S(L, u_{max})} \quad (4)$$

<Tone-Conversion Characteristic>

Here, a tone-conversion characteristic that is calculated by the first embodiment is described. Here, a tone for input data is represented by 14 bits (=16384 levels), a relation between an input tone value and a luminance value is linear, and a maximum luminance is 800 cd/m². In relation to such an input tone, a 10 bit output tone (=1024 levels) is assigned.

At this time, a luminance difference ΔYin(n, n+1) for luminance values Yin(n) and Yin(n+1) corresponding to input tone values n and (n+1) is calculated by Equation (1).

Figure 4A:
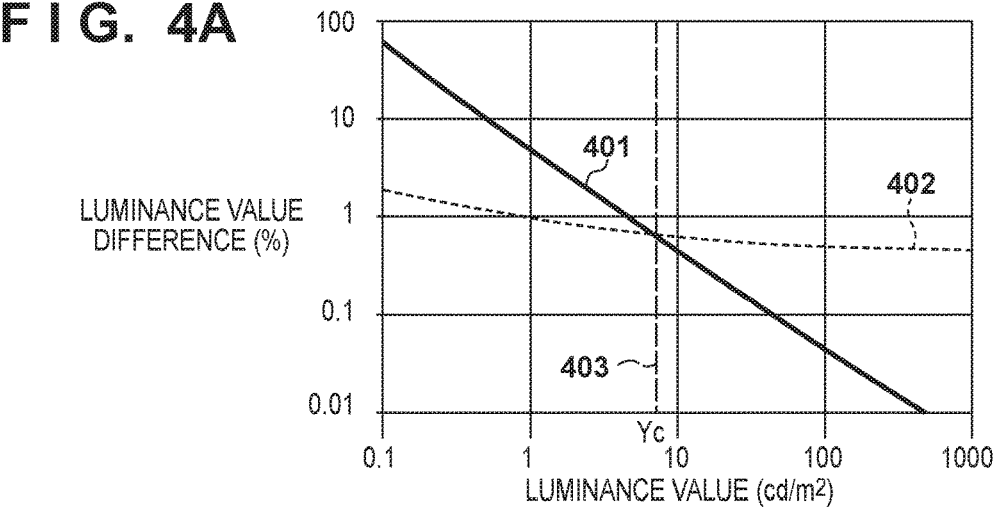
FIG. 4A to FIG. 4C are views illustrating examples of tone-conversion characteristics calculated in the first embodiment.
Figure 4B:
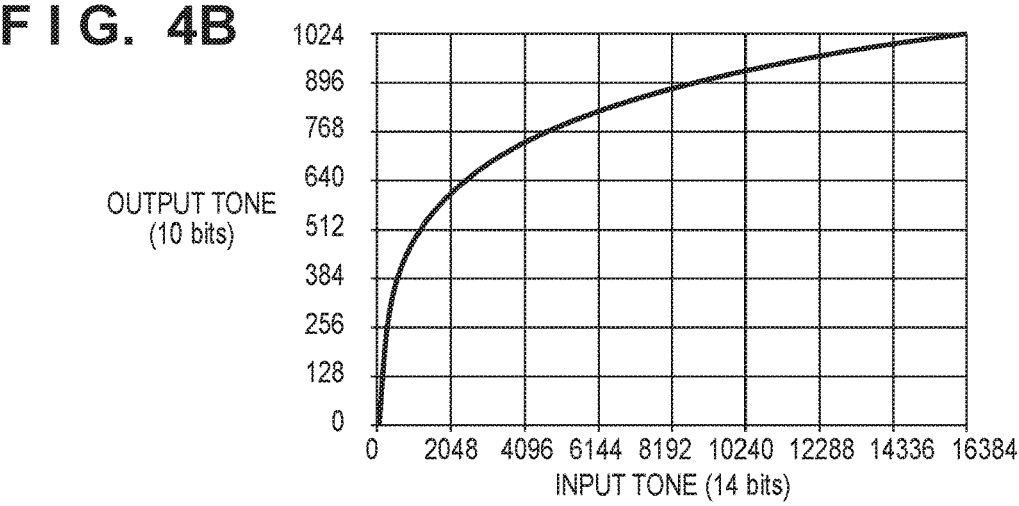
Figure 4C:
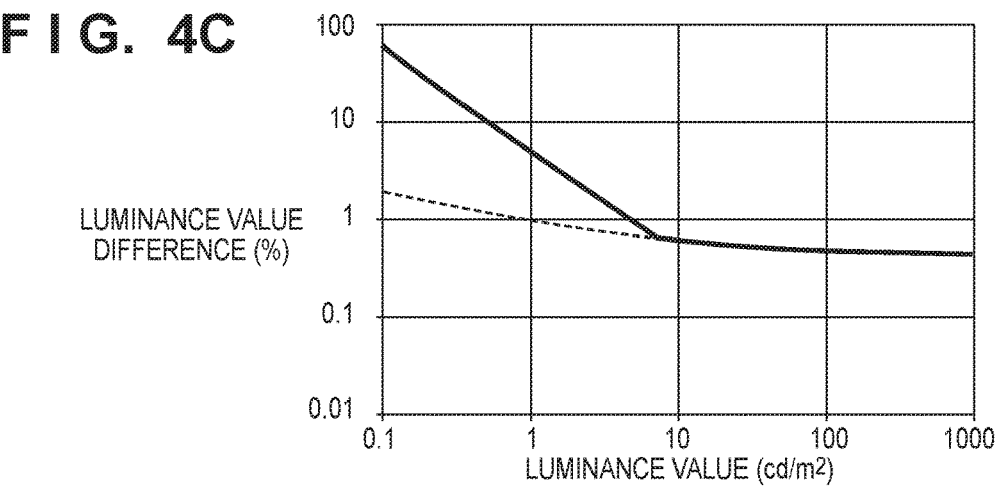

FIG. 4A to FIG. 4C are views illustrating examples of tone-conversion characteristics calculated in the first embodiment. A curve 401 of FIG. 4A indicates a luminance difference of each tone in the input tones that is calculated by Equation (1). For example, a characteristic of the input tone of the input image is based on a tone characteristic of the image capturing apparatus that generates the input image. Also, a curve 402 of FIG. 4A indicates the JND calculated by the Barten model.

In the first embodiment, the luminance value (Yc) of the intersection point between the curve 401 and the curve 402 is set as a predetermined luminance threshold, and in a luminance range in which the luminance values are smaller than the predetermined luminance threshold, a tone difference (luminance difference) of an input tone is assigned to the tone difference (luminance difference) of the output tone as is. Meanwhile, in a luminance range in which the luminance values are greater than or equal to the predetermined luminance threshold, the luminance difference cannot be visually discriminated even if the input tone count is increased by 1. For this reason, the tone difference of the output tone is caused to increase to a value at which the luminance difference cannot be visually discriminated.

FIG. 4B illustrates a tone-conversion characteristic (input/output tone correspondence relation) that is calculated as described above. Also, FIG. 4C indicates a relation between the luminance in the output tone of FIG. 4B and the luminance difference for one tone.

As can be understood from FIG. 4C, by virtue of the first embodiment, an input data tone difference is outputted as is in a luminance range of luminances smaller than Yc. Meanwhile, in a luminance range of luminances larger than Yc, a tone conversion is performed to obtain a tone such that that the tone difference of the output tone does not exceed the tone difference of the input data.

<Tone Conversion Method>

In the foregoing description, a tone-conversion characteristic calculation method is described. Configuration is such that in the actual tone conversion processing, output tone values corresponding to each tone value of the input tone are calculated in advance by the method described above, and are saved in the format of a lookup table (described as an LUT hereinafter) and are used.

Figure 5:
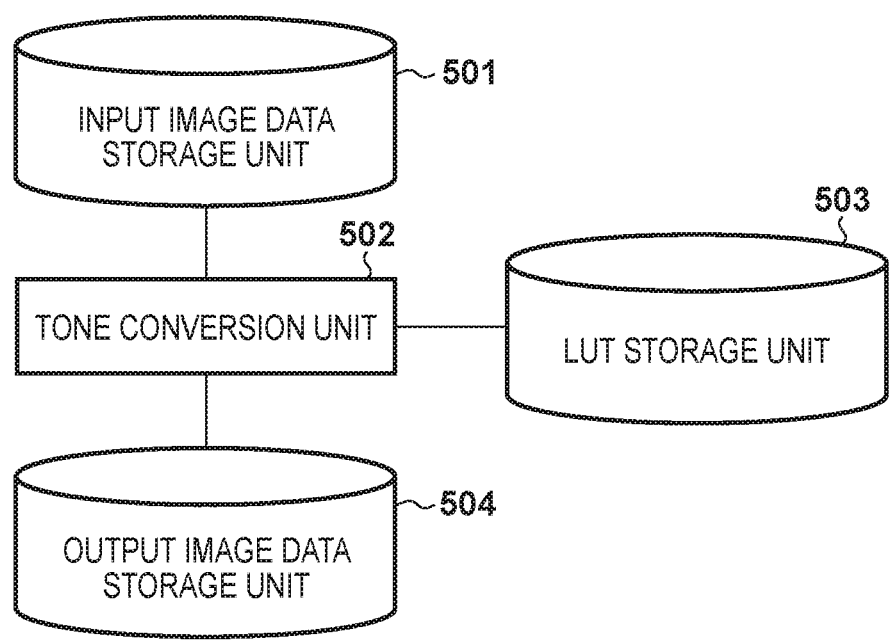
FIG. 5 is a view for describing tone conversion processing using a lookup table (LUT).

FIG. 5 is a view for describing tone conversion processing that uses an LUT. A tone conversion unit 502 obtains input image data that is the target of tone conversion processing from an input image data storage unit 501. Then, the tone conversion unit 502 references the LUT saved in an LUT storage unit 503, calculates an output tone value corresponding to each tone value included in the input image data, and stores the calculated values in an output image data storage unit 504 as output image data.

As described above, by virtue of the first embodiment, a luminance difference between tones is decided considering a characteristic of visual perception (JND) of a human. By this, it becomes possible to decide an efficient tone-conversion characteristic by which it is possible to reduce tone loss while suppressing the occurrence of a visual tone gap.

Second Embodiment

In the second embodiment, another embodiment for deciding a conversion characteristic is described. Specifically, in the second embodiment, a tone reproduction characteristic of an image output device (an imaging element or the like) is used in place of using a JND which is a characteristic of visual perception in the first embodiment as a luminance difference threshold.

<Apparatus Configuration>

Figure 6:
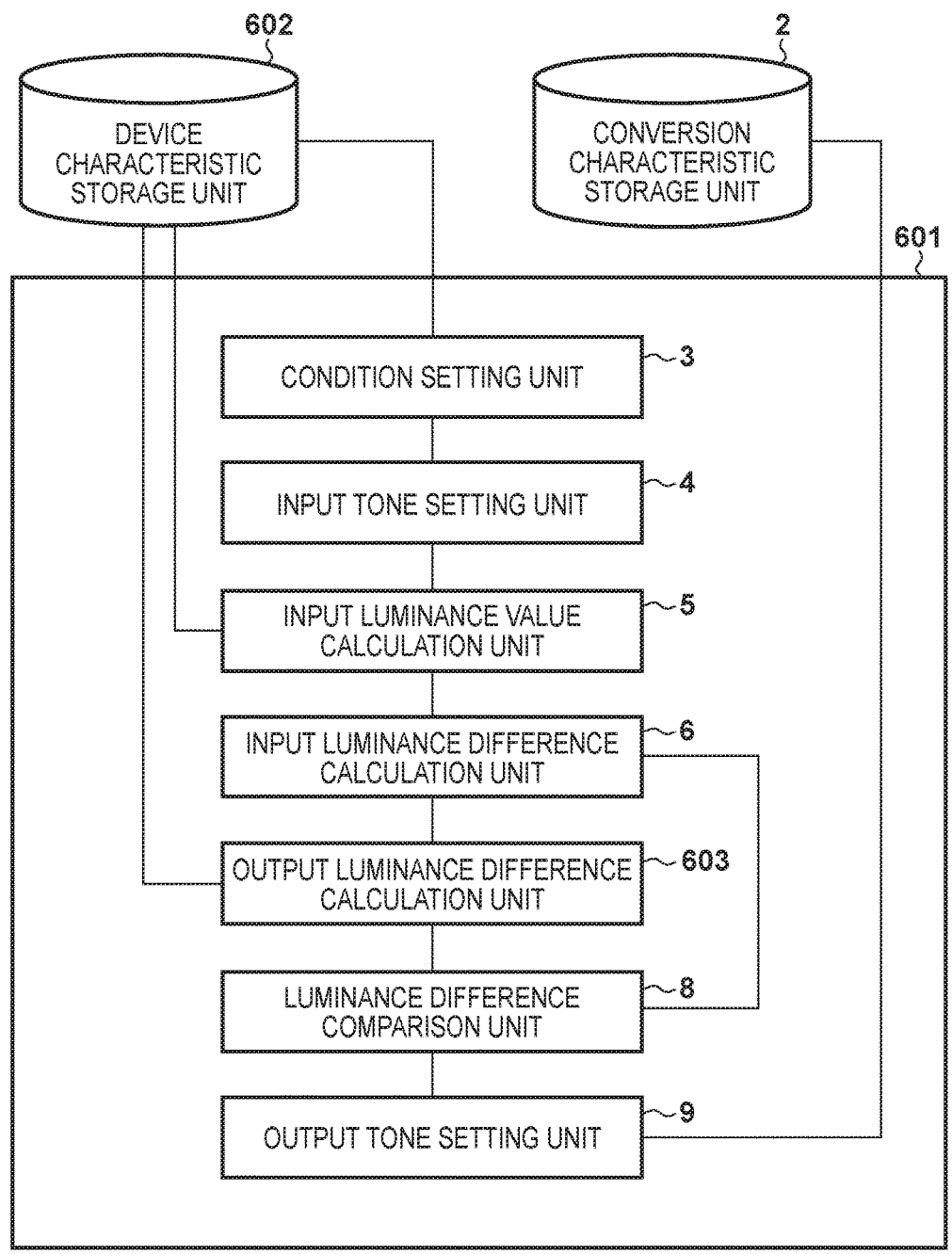
FIG. 6 is a block diagram illustrating a configuration of an image processing apparatus according to a second embodiment.

FIG. 6 is a block diagram illustrating a configuration of an image processing apparatus according to the second embodiment. Note that the condition setting unit 3 to the input luminance difference calculation unit 6 and the luminance difference comparison unit 8 to the output tone setting unit 9 are similar to the functional units of the same names in FIG. 1, and therefore explanation thereof is omitted.

An image processing apparatus 601, similarly to in the first embodiment, is an apparatus that calculates a tone-conversion characteristic for converting an input image represented by M levels into an output image of N levels. A device characteristic storage unit 602 stores the tone characteristics of each of the image input device and the image output device that are the targets of input and output of the tone conversion. An output luminance difference calculation unit 603 calculates a luminance difference of an output tone for a tone characteristic of the image output device that is stored in the device characteristic storage unit 602.

Figure 7:
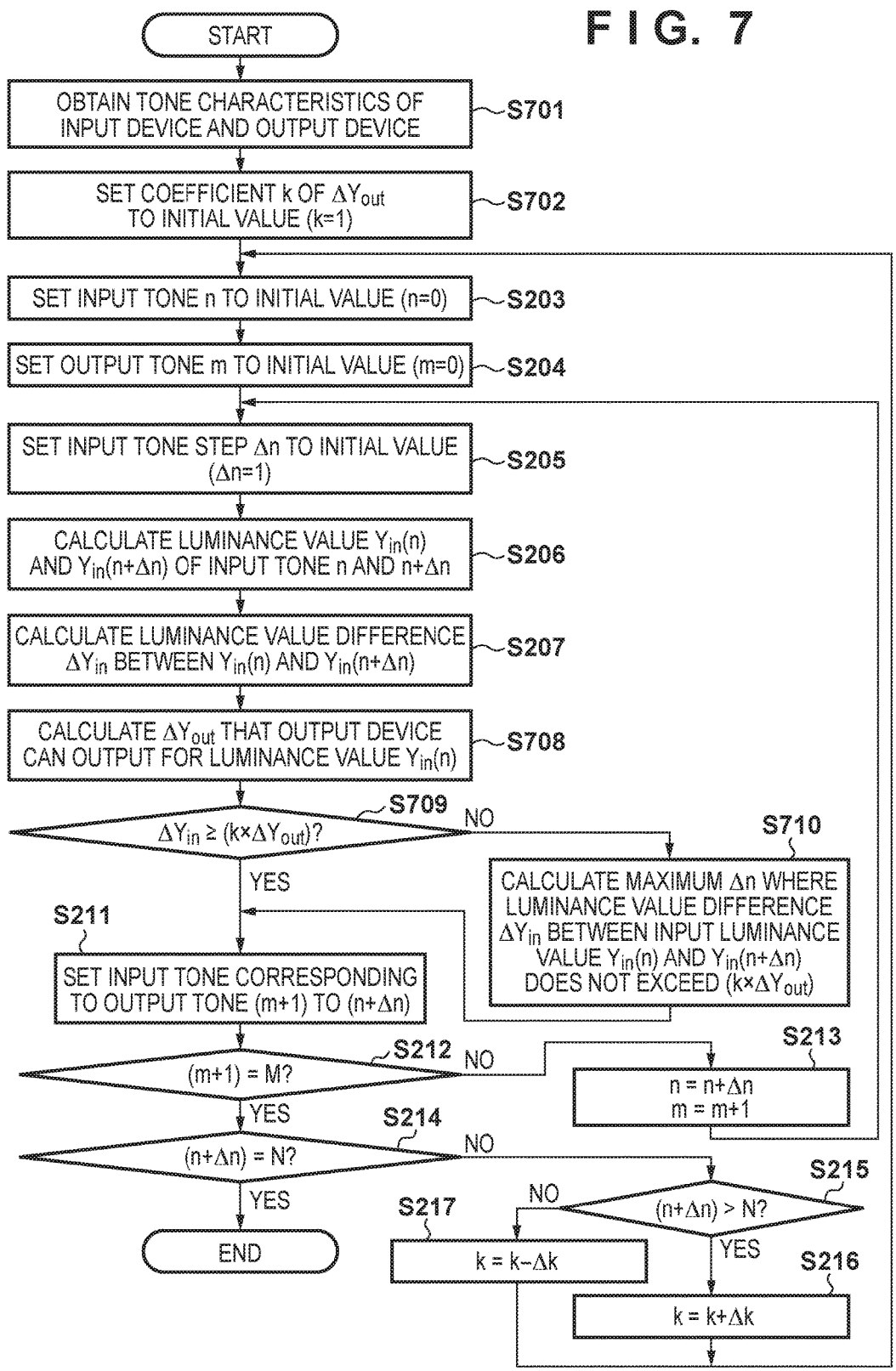
FIG. 7 is a flowchart illustrating processing of the image processing apparatus in the second embodiment.

FIG. 7 is a flowchart illustrating processing of the image processing apparatus in the second embodiment. Note that since step S203 to step S207 and step S211 to step S217 are similar to in the first embodiment, explanation thereof is omitted.

In step S701, the condition setting unit 3 obtains from the device characteristic storage unit 602 tone characteristics of the input device and the output device that are the targets of tone conversion. Here, as a tone characteristic of the input device, a tone characteristic of the video signal outputted from an image capturing apparatus such as a digital camera, for example, is obtained. Specifically, a relation between an input tone value and a luminance value of a subject is obtained. Also, as a tone characteristic of the output device, a tone characteristic of the video signal inputted into an image display apparatus such as a liquid crystal display, for example, is obtained. Specifically, a relation between an output tone value and an emission luminance value is obtained. In step S702, the condition setting unit 3 sets the initial value of a coefficient k of ΔYout. Here, k=1 is set.

In step S708, the luminance difference calculation unit 6 calculates a tone value m of the output device corresponding to the luminance value Yin(n). After this, the luminance difference ΔYout of the emission luminances Yout(m) and Yout(m+1) corresponding to the tone values m and (m+1) in the output device are calculated by using Equation (1).

In step S709, the luminance difference comparison unit 8 compares the luminance difference ΔYin of the input tone calculated in step S207 and a value (k×ΔYout) resulting from multiplying the coefficient k with ΔYout which is calculated in step S708. At this time, if the value of ΔYin is greater than or equal to (k×ΔYout), the processing proceeds to step S211, and if not, the processing proceeds to step S710. In step S710, the output tone setting unit 9 repeatedly increases the value of Δn, and when a maximum Δn value at which a luminance difference ΔYin between the input luminance values Yin(n) and Yin(n+Δn) does not exceed the given threshold (k×ΔYout) is calculated, the processing proceeds to step S211.

<Threshold Setting>

In the first embodiment, a configuration in which a JND which is a visual discrimination luminance is used as a threshold for a tone gap determination is described. In the second embodiment, a tone reproduction characteristic of the output device, specifically a minimum luminance difference (ΔYout) that an output device can reproduce is used. This method is effective in a case where characteristics of the output device can be identified in addition to those of the input device.

Figure 8:
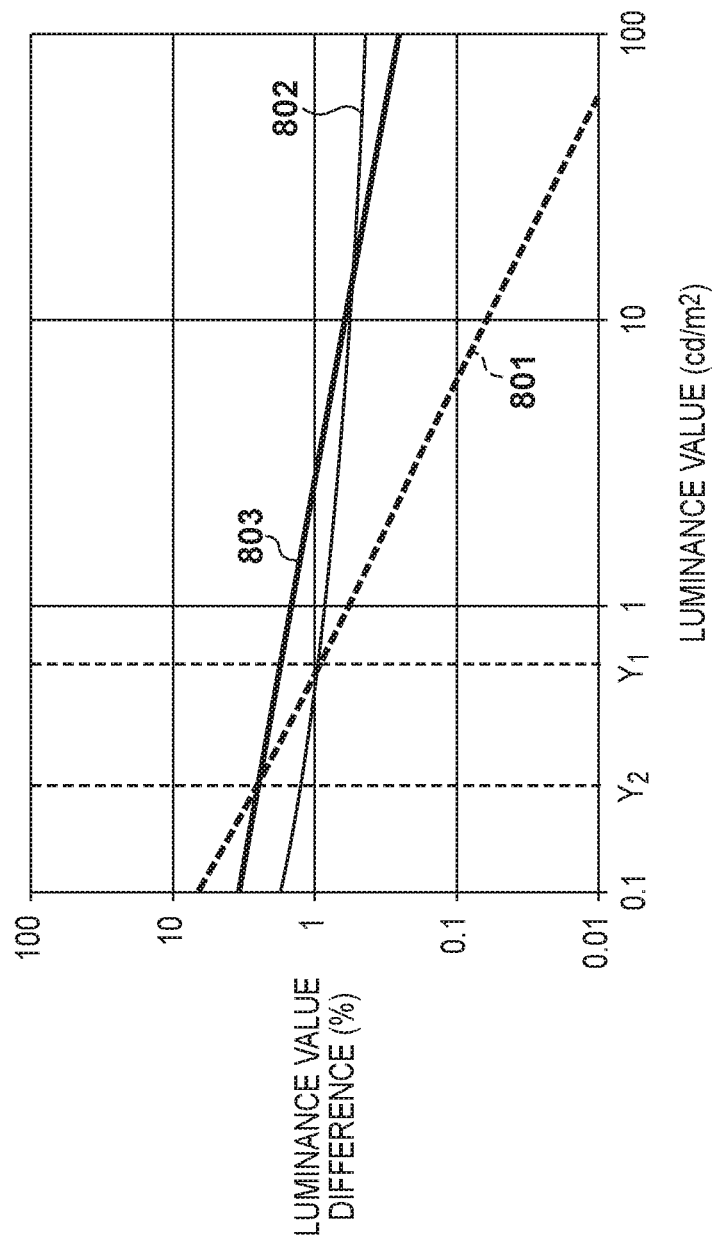
FIG. 8 is a view illustrating a difference in thresholds in the first and a second embodiment.

FIG. 8 is a view illustrating a difference between the threshold in the first embodiment and the threshold in the second embodiment. A curve 801 indicates a tone characteristic of the input device, a curve 802 indicates the JND, and a curve 803 indicates a tone characteristic of the output device.

In the first embodiment in which the threshold is set based on the JND, a tone difference (luminance difference) of input tones in the luminance range of luminances smaller than Y1 is assigned as is to the tone difference of the output tone. However, in such a case, there is a range (the range of Y2 to Y1) in which the luminance difference of the input tones cannot be reproduced in the output device. Specifically, in the luminance range Y2 to Y1, the output tone values are set at a finer pitch than the tones that can be reproduced, and so unnecessary tones are produced.

Accordingly, in the second embodiment, the tone differences (luminance difference) of the input tones in the luminance range of luminances smaller than Y2 are assigned as are to the tone differences of the output tones, considering the characteristic (the curve 803) of the output device. Also, in the luminance range of luminances larger than Y2, the input tone difference where the luminance difference is the maximum in the range that does not exceed the curve 803 is assigned to the output tone difference.

As described above, by virtue of the second embodiment, a threshold for determining a tone gap is set considering the tone characteristics of both the input device and the output device. By this configuration, it becomes possible to convert input tones into less output tones more efficiently.

Third Embodiment

In the third embodiment, an embodiment is explained in which tone conversion processing is performed by, based on the image capturing condition (exposure condition) for when the input image is captured, calculating a correspondence relation of an absolute luminance in relation to each tone of the input data, and then calculating a tone-conversion characteristic based on the luminance difference for one tone of an input tone and a JND.

<Apparatus Configuration>

Figure 9:
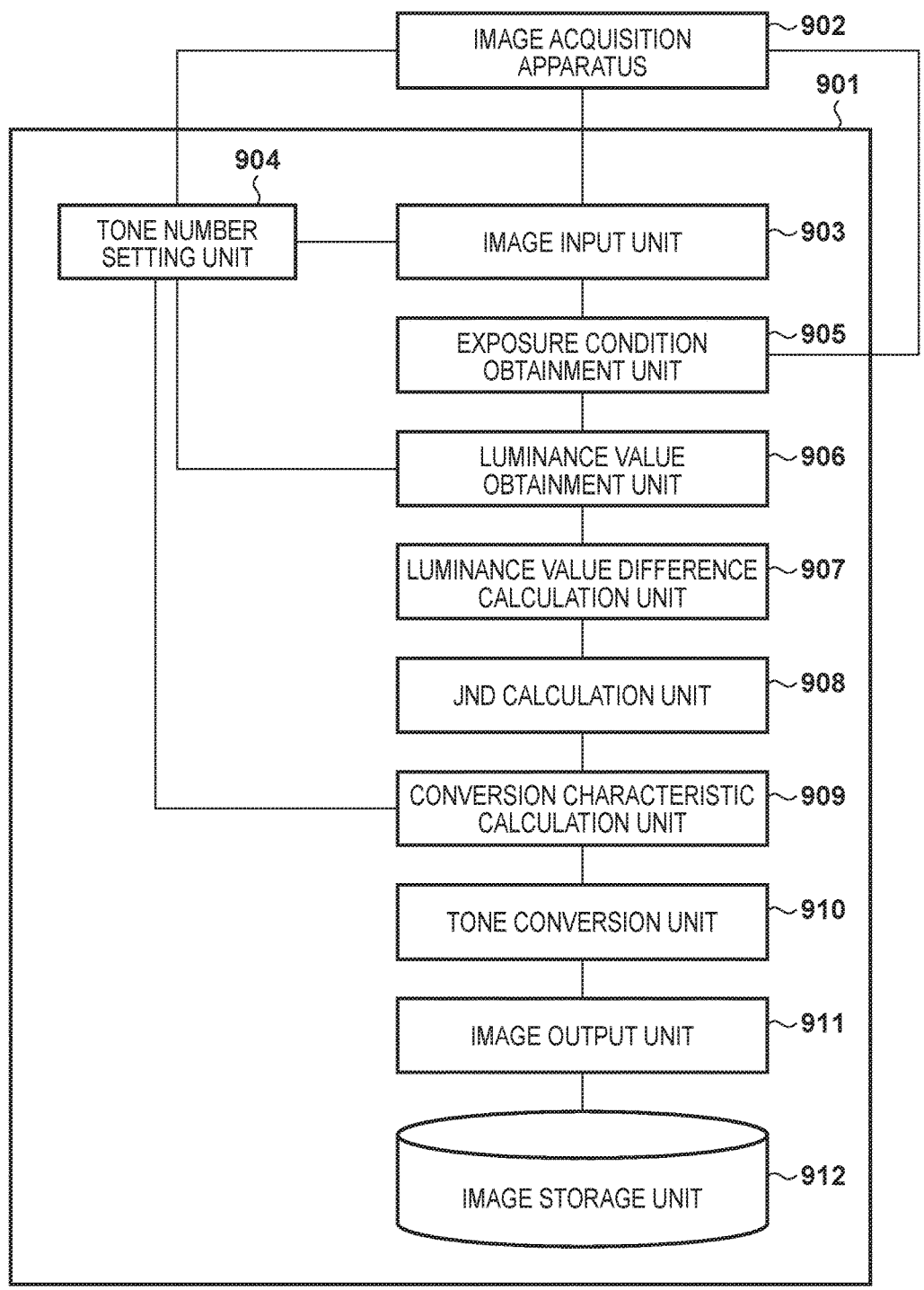
FIG. 9 is a block diagram illustrating a configuration of an image processing apparatus according to a third embodiment.

FIG. 9 is a block diagram illustrating a configuration of an image processing apparatus according to the third embodiment. An image processing apparatus 901 is an apparatus that converts image data represented by M levels into image data of N levels. An image acquisition apparatus 902 is an apparatus that obtains image data of a digital camera or the like.

An image input unit 903 reads from the image acquisition apparatus 902 image data as input data. A tone number setting unit 904 sets the tone numbers of the input data and the output data (the input tone number M and the output tone number N). An exposure condition obtainment unit 905 obtains an exposure condition for when the input image is captured. A luminance value obtainment unit 906, based on the exposure condition obtained at the exposure condition obtainment unit 905, derives absolute luminance values corresponding to pixel values for the input tones (M levels) set by the tone number setting unit 904. A luminance difference calculation unit 907, based on an absolute luminance value of the input data calculated in the luminance value obtainment unit 906, calculates the luminance difference for one tone for input tones.

A JND calculation unit 908 calculates a minimum luminance difference that can be visually discriminated (hereinafter described as a JND) in relation to the absolute luminance value calculated by the luminance value obtainment unit 906. A conversion characteristic calculation unit 909 calculates a tone-conversion characteristic based on the absolute luminance value calculated in the luminance value obtainment unit 906 and the JND calculated in the JND calculation unit 908. A tone conversion unit 910 generates output data by performing input data tone conversion processing by using the tone-conversion characteristic calculated in the conversion characteristic calculation unit 909. An image output unit 911 outputs output data converted in the tone conversion unit 910. An image storage unit 912 stores image data (output data) after the tone conversion that is outputted by the image output unit 911.

<Apparatus Operation>

FIG. 10 is a flowchart illustrating processing of the image processing apparatus in the third embodiment. In step S1001, the image acquisition apparatus 902 obtains the image data. For example, a capture is performed by a digital camera, and image data is generated. In step S1002, the tone number setting unit 904 sets the tone numbers of the input data and the output data. For example, via a user interface (not shown), a designation from a user is received.

In step S1003, the image input unit 903 reads the image data obtained in step S1001 as input data. For example, image data is received via a network, or image data is read via a storage medium such as a flash memory. In step S1004, the exposure condition obtainment unit 905 obtains an exposure condition such as an aperture/shutter speed/ISO sensitivity by a setting of the camera of the time of the image obtainment in step S1001. For example, a camera setting of the time of capture of the input data is received via a network or an exposure condition is obtained by reading metadata added to the input data (an EXIF tag or the like).

Alternatively, configuration may be taken to receive information related to a condition of an aperture/shutter speed/ISO sensitivity by a manual operation by a user via a user interface (not shown graphically). Specifically, if information needed to calculate a correspondence relation between a pixel value and an absolute luminance of a time when the image is captured can be obtained, there is no limitation to the method therefor.

In step S1005, the luminance value obtainment unit 906, based on an exposure condition obtained in step S1004, derives a correspondence relation between an absolute luminance value and a pixel value of the input data read in step S1002. In step S1006, the luminance difference calculation unit 907 calculates a luminance difference of a case in which the input pixel value changed by one tone from the correspondence relation calculated in step S1005. The details of the luminance difference calculation are described later.

In step S1007, the JND calculation unit 908 calculates a JND at each tone based on the absolute luminance value and the pixel value of the input image calculated in step S1005. Note that explanation of the calculation of the JND is omitted because it is similar to the first embodiment. In step S1008, the conversion characteristic calculation unit 909, based on the relation between the luminance difference calculated in step S1006 and the JND calculated in step S1007, calculates a tone-conversion characteristic between input and output data. The details of the tone-conversion characteristic calculation are described later.

In step S1009, the tone conversion unit 910 performs tone conversion processing on the input data read in step S1001 by using the tone-conversion characteristic calculated in step S1008. In step S1010, the image output unit 911 stores in the image storage unit 912 an image for which the tone conversion processing is performed in step S1009.

<Input Tone Luminance Difference Calculation (Step S1006)>

The luminance values corresponding to the input tone n and the input tone (n+1) are Yin(n) and Yin(n+1). Here, the luminance difference ΔYin(n) between the input tones n and (n+1) is calculated by using Equation (5).

$$\Delta Y_{in}(n) = \frac{Yin(n+1) - Yin(n)}{\{Yin(n+1) + Yin(n)\}/2} \times 100 \quad (5)$$

<Tone-Conversion Characteristic Calculation (Step S1008)>

Figure 11A:
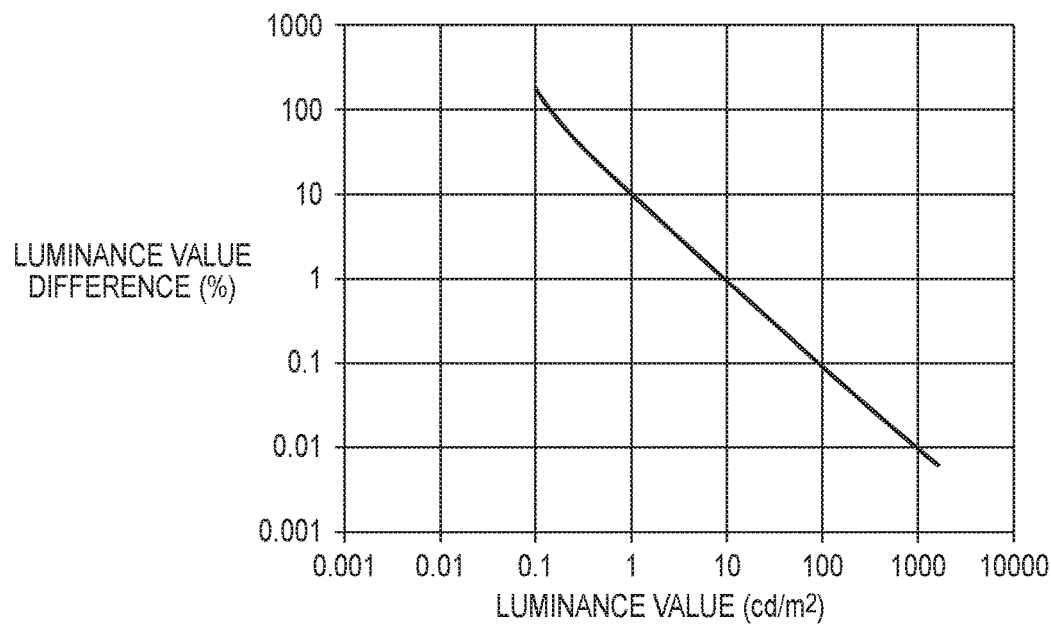
FIG. 11A and FIG. 11B are views for describing a tone-conversion characteristic calculation method.
Figure 11B:
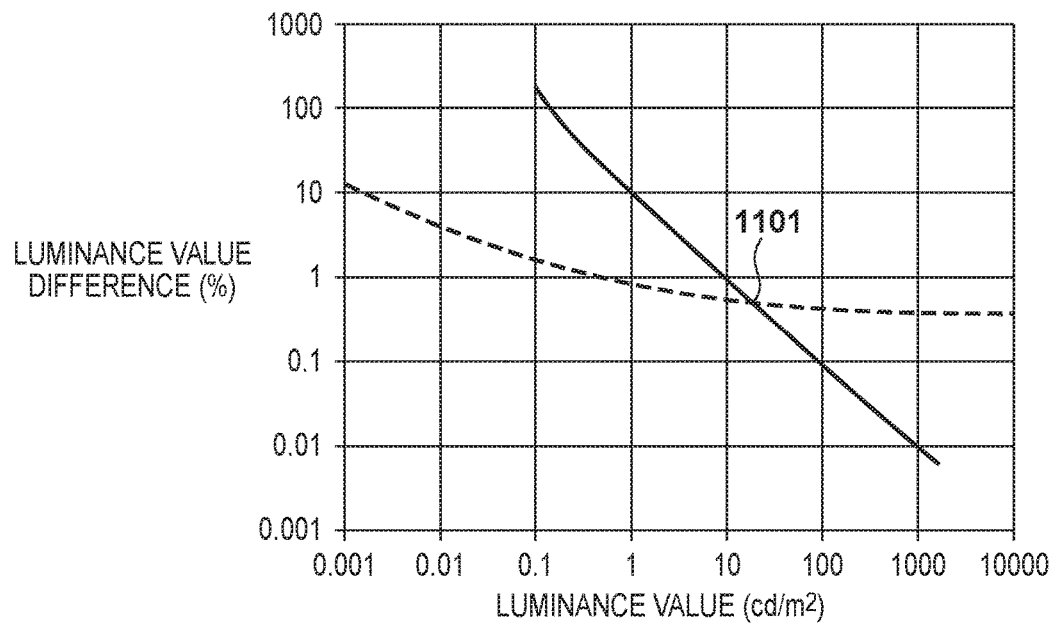

Here, input data is represented by 14 bits (=16384 levels), and a relation between an input tone and a luminance value is linear. FIG. 11A and FIG. 11B are views for describing a tone-conversion characteristic calculation method.

At the time of a particular exposure condition A (aperture $f_0$, shutter speed $s_0$, and ISO sensitivity $I_0$), the saturation luminance of the sensor used for capturing is 1600 cd/m². An output value from the sensor is quantized in 14 bits with this condition, and when a luminance difference for one tone is calculated for all tones by Equation (5), FIG. 11A is obtained. Specifically, because the luminance is divided linearly into 16384 levels in relation to a maximum luminance of 1600 cd/m², the luminance difference for one tone is approximately 0.098 cd/m².

Here, since the luminance difference calculated in Equation (5) is represented as a ratio in relation to the absolute luminance, the larger the absolute luminance is, the smaller the value of Yin(n) becomes. Accordingly, FIG. 11A has a monotonically decreasing characteristic. Here, FIG. 11B illustrates the value (dashed line) of the JND calculated in Equation (2) superimposed on the characteristic (solid line) of FIG. 11A.

It can be seen from FIG. 11B that in low luminances, the luminance difference for one tone of the sensor output value is larger than the JND, and in high luminances, the luminance difference for one tone of the output value falls below the JND. Specifically, on the side of low luminances, in a case where there are less output tones than input tones (sensor output values), the luminance difference for one tone of the output tones increases, and so tone gaps become larger. Meanwhile, because the luminance difference for one tone of input tones falls below the JND sufficiently on the high luminance side, tone gaps are not perceived visually even in the case where there are fewer output tones than input tones.

Accordingly, a tone gap for one tone of sensor output values and the JND are compared and an intersection point 1101 is obtained. Then, in a luminance range of luminances smaller than the intersection point 1101, one tone difference of sensor output values is associated as is as one tone difference of output tone values. Meanwhile, in a luminance range of luminances larger than the intersection point 1101, a maximum tone difference at which a luminance difference of sensor output values does not exceed the JND is associated as one tone of the output tones.

Figure 12:
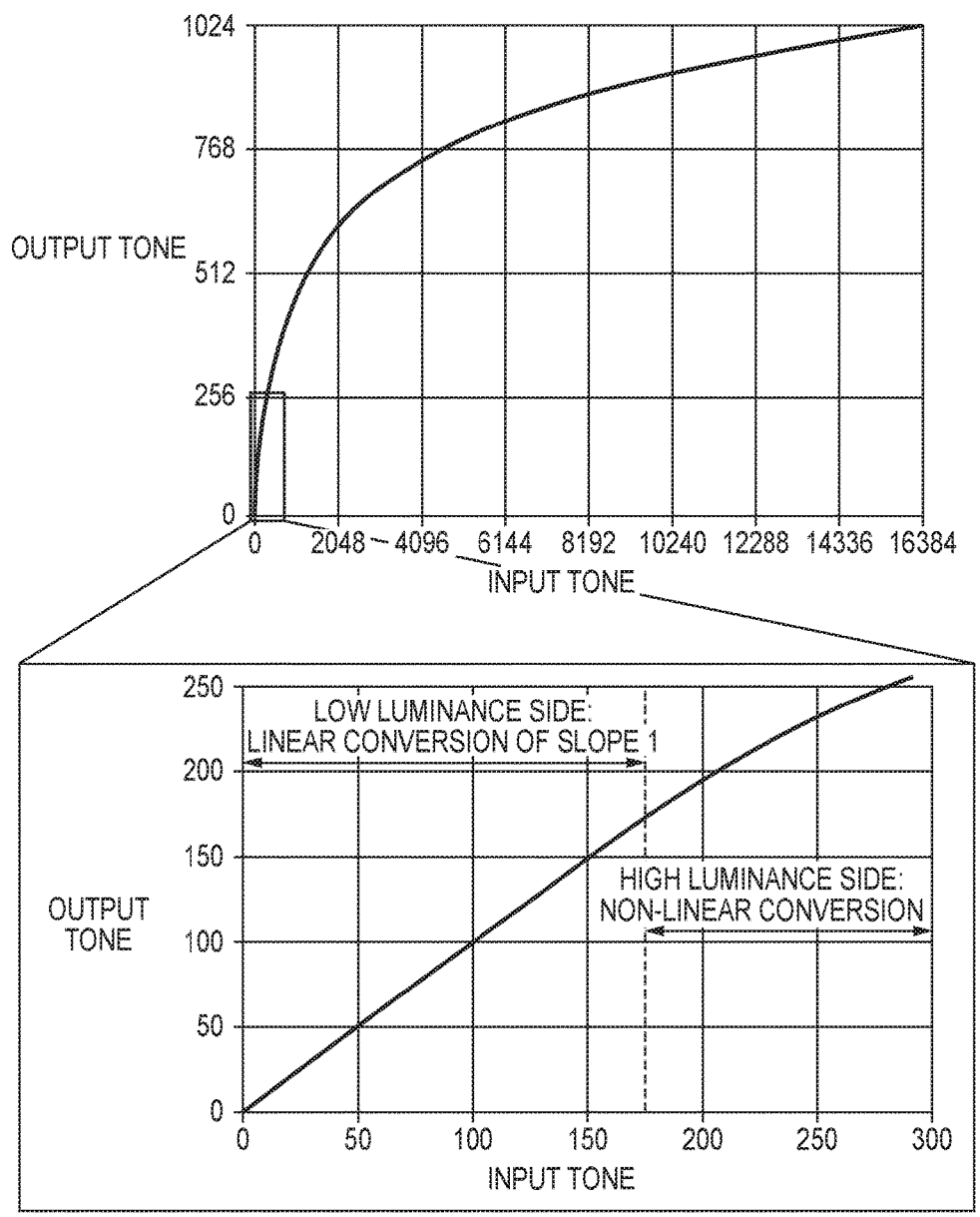
FIG. 12 is a view for describing a calculated tone-conversion characteristic.

FIG. 12 is a view for describing a calculated tone-conversion characteristic. The tone characteristic illustrated in FIG. 12 is such that a luminance value corresponding to the intersection point 1101 of FIG. 11B is a boundary, and the output tone is a straight line with a slope of 1 in relation to the input tone on the low luminance side and the characteristic is of non-linear form such that an output tone value is outputted with less tones than in the input tones on the high luminance side.

Additionally, here, a case in which an exposure condition is changed is considered. For example, conditions in which in relation to the condition A, the exposure level is caused to change to be plus four steps (assumed to be condition B) and minus four steps (assumed to be condition C) are considered. Here, the aperture and the ISO sensitivity are $f_0$ and $I_0$. At this time, the shutter speeds are 16 times and $\frac{1}{16}$ times the shutter speed of the condition A. Assuming that the sensor output values are in a proportional relation to the exposure amount, in the exposure conditions of condition B and condition C, the saturation luminances of the sensor are 100 cd/m$^2$ and 25600 cd/m$^2$ respectively.

Figure 13A:
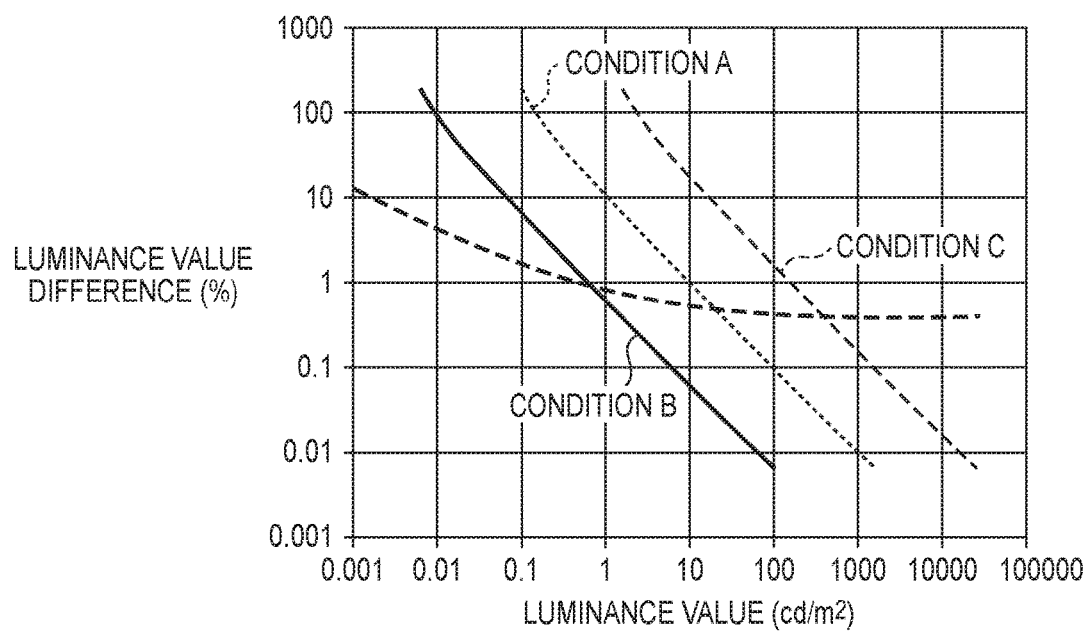
FIG. 13A and FIG. 13B are views for describing a difference in a tone-conversion characteristic due to a difference in exposure.
Figure 13B:
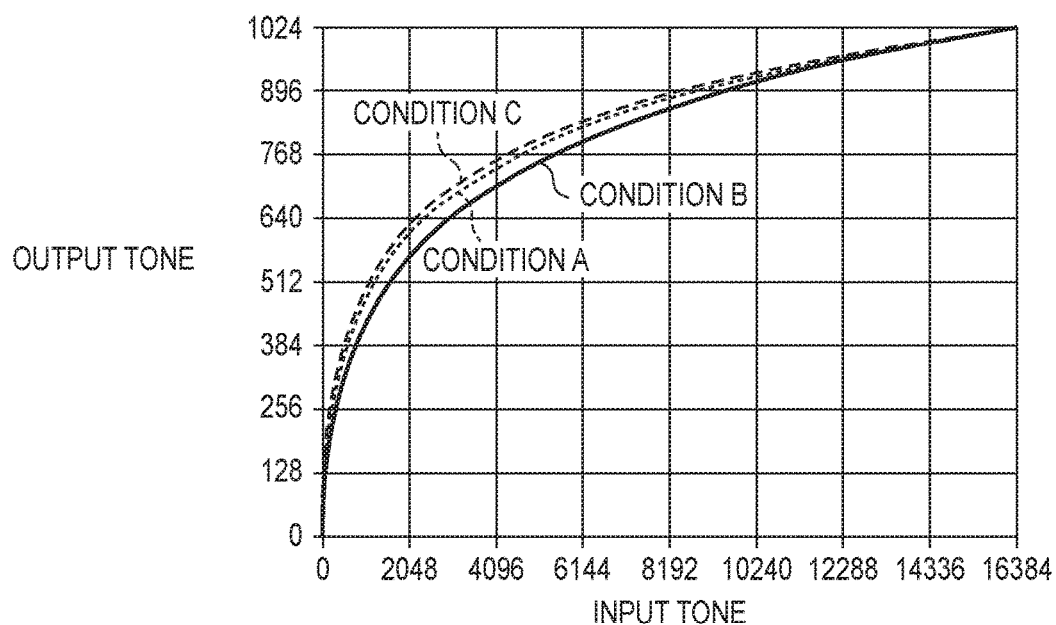

FIG. 13A and FIG. 13B are views for describing differences in a tone-conversion characteristic due to the differences in exposure. Regarding the condition B and the condition C, similarly to the case of the condition A, when the luminance difference for one tone at all tones of the sensor output values is calculated, FIG. 13A is obtained. As is clear from FIG. 13A, in the case where the exposure condition differ, the intersection point with the JND also differs. For this reason, in the case of calculating the tone-conversion characteristic by the foregoing method, as in FIG. 13B, tone-conversion characteristics that differ for each exposure condition are calculated.

As described above, by virtue of the third embodiment, tone conversion is performed by calculating the tone-conversion characteristic based on the JND and the luminance difference for one tone of the input tone. Specifically, tone conversion processing that considers a minimum luminance difference at which a visual luminance discrimination is possible, which depends on an absolute luminance value of a subject actually captured, is performed. By this, tone conversion processing having less tone gaps becomes possible.

Fourth Embodiment

In the fourth embodiment, a method of selecting, and using, one tone-conversion characteristic from a plurality of tone-conversion characteristics that are generated in advance in accordance with a setting value of an exposure condition for when an input image is captured is described.

<Apparatus Configuration>

Figure 14:
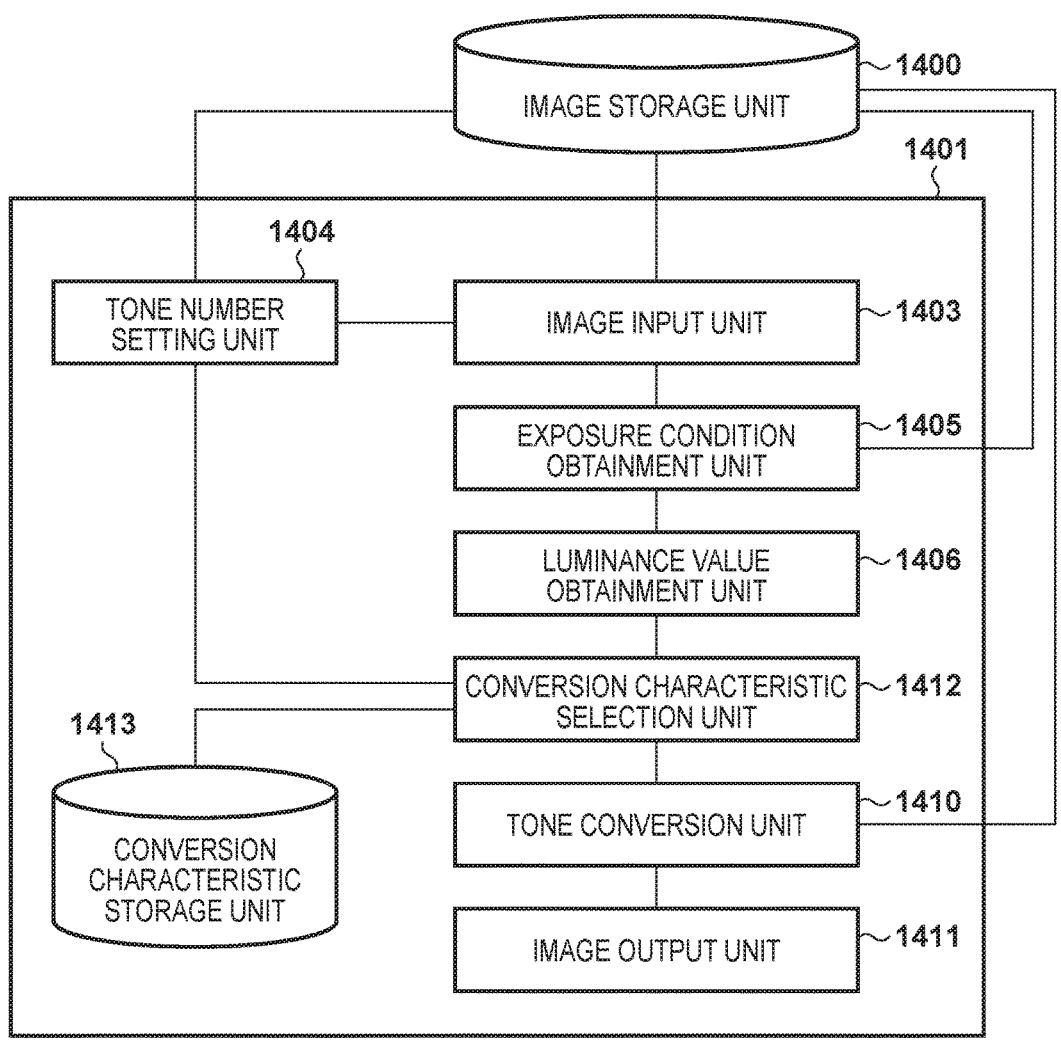
FIG. 14 is a block diagram illustrating a configuration of an image processing apparatus according to a fourth embodiment.

FIG. 14 is a block diagram illustrating a configuration of an image processing apparatus according to the fourth embodiment. An image processing apparatus 1401 is an apparatus that converts input tones represented by M levels into N output levels. Note that an image input unit 1403 to an input tone luminance obtainment unit 1406 and a tone conversion unit 1410 to an image output unit 1411 are similar to the image input unit 903 to the luminance value obtainment unit 906 and the tone conversion unit 910 to the image output unit 911 in FIG. 9, and so explanation is omitted.

A conversion characteristic selection unit 1412, based on an exposure condition obtained at the exposure condition obtainment unit 1405, selects one tone-conversion characteristic from out of a plurality of a tone-conversion characteristics. A conversion characteristic storage unit 1413 stores in advance the tone-conversion characteristics corresponding to a plurality of exposure conditions.

<Apparatus Operation>

FIG. 15 is a flowchart illustrating processing of the image processing apparatus in the fourth embodiment. Note that step S1501 to step S1504 and step S1506 to step S1507 are similar to step S1001 to step S1004 and step S1009 to step S1010 in the third embodiment, and therefore description is omitted.

In step S1505, the conversion characteristic selection unit 1412 selects one tone-conversion characteristic from out of a plurality of tone-conversion characteristics stored in the conversion characteristic storage unit 1413. Specifically, based on the correspondence relation obtained in step S1504, a tone-conversion characteristic is selected. Details of the selection of the conversion characteristic are described later.

<Tone-Conversion Characteristic Selection (Step S1505)>

As is described in the foregoing third embodiment, by changing the exposure condition for the time of capture, a saturation luminance of the sensor and a luminance interval for one tone in the sensor output change. Processing for changing the tone-conversion characteristic is performed in conjunction with this, but the tone-conversion characteristic need not be calculated for every capture. Specifically, since calculation is possible from an exposure condition if a camera sensor characteristic is known, it is possible to calculate the tone-conversion characteristic in advance in accordance with a relation between an input pixel value and an absolute luminance value. At the time of actual capture, one tone-conversion characteristic that is compatible with an exposure condition may be selected from a plurality of tone-conversion characteristics that are calculated in advance.

It is not necessary, at this time, to calculate the tone-conversion characteristic for all combinations of the aperture, the shutter speed, and ISO sensitivity that the camera can set. For example, as indicated in Equation (6), configuration may be taken so as to calculate an EV value from the aperture, shutter speed, and ISO sensitivity values, and based on the EV value, select the tone-conversion characteristic.

$$EV = 2 \cdot \log_2(F) - \log_2(s) - \log_2\left(\frac{ISO}{100}\right) \qquad (6)$$

F: aperture
s: shutter speed
ISO: ISO sensitivity

Note that configuration may be taken such that the tone-conversion characteristics are stored in an LUT form, or such that they are approximated by a function as in Equation (7) and only the function parameters are stored.

$$o = \begin{cases} i + k & i < \text{threshold} \\ c \cdot \log(a \cdot i + b) + d & i \geq \text{threshold} \end{cases} \qquad (7)$$

i: input pixel value
o: output pixel value
a, b, c, d, k: constants

As described above, by virtue of the fourth embodiment, based on a camera sensor characteristic, a plurality of tone-conversion characteristics are calculated in advance, one tone-conversion characteristic is selected in accordance with an exposure condition, and that tone-conversion characteristic is used. Thereby, it ceases to be necessary to calculate a tone-conversion characteristic for every capture, and so the computation cost is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-196728, filed Oct. 4, 2016, 2017-137337, filed Jul. 13, 2017, which are hereby incorporated by reference herein in their entirety.

What is claimed is:

1. An image processing apparatus that decides a tone-conversion characteristic for converting an M level input image into an N level output image (where M>N), the apparatus comprising:
   at least one processor; and
   a memory including instructions that, when executed by the at least one processor, cause the image processing apparatus to:
   decide a maximum d (where d is a positive integer) at which a difference between a luminance value Y(i) corresponding to an ith level of the input image and a luminance value Y(i+d) corresponding to an (i+d)th level does not exceed a given threshold; and
   based on the decided maximum d, set the tone-conversion characteristic so that the ith level and the (i+d)th level of the input image respectively correspond to a jth level and a (j+1)th level of an output image.

2. An image processing apparatus that decides a tone-conversion characteristic for converting an M level input image into an N level output image (where M>N), wherein the instructions, when executed by the at least one processor, cause the image processing apparatus to:
   in a luminance range of luminances smaller than a predetermined luminance threshold, set the tone-conversion characteristic so that an ith level and an (i+1)th level of the input image respectively correspond to a jth level and a (j+1)th level of the output image; and
   in a luminance range of luminances greater than or equal to the predetermined luminance threshold, decide a maximum d (where d is a positive integer greater than or equal to 2) at which a difference between a luminance value Y(i) corresponding to an ith level of the input image and a luminance value Y(i+d) corresponding to an (i+d)th level does not exceed a given threshold, and set the tone-conversion characteristic so that the ith level and the (i+d)th level of the input image respectively correspond to a jth level and a (j+1)th level of the output image.

3. The image processing apparatus according to claim 2, wherein
   the input image is an image captured by an image capturing apparatus,
   wherein the instructions, when executed by the at least one processor, further cause the image processing apparatus to:
      obtain an image capturing condition in the image capturing apparatus for when the input image is captured; and
      derive, based on the image capturing condition, a correspondence relation of a luminance value in relation to each level in the input image, and
   wherein the tone-conversion characteristic is set based on the correspondence relation.

4. The image processing apparatus according to claim 2, wherein
   the input image is an image captured by an image capturing apparatus,
   wherein the instructions, when exectued by the at least one processor, further cause the image processing apparatus to:
      obtain an image capturing condition in the image capturing apparatus for when the input image is captured; and
      store a plurality of tone-conversion characteristics corresponding to a plurality of image capturing conditions in the image capturing apparatus, and
   wherein one tone-conversion characteristic corresponding to the image capturing condition is selected from the plurality of tone-conversion characteristics.

5. The image processing apparatus according to claim 1, wherein
   the given threshold is a value obtained by multiplying a coefficient k with a predetermined function related to a luminance value, and
   wherein the instructions, when executed by the at least one processor, further cause the image processing apparatus to decide the coefficient k so that in the tone-conversion characteristic, an (M−1)th level in the input image corresponds to an (N−1)th level in the output image.

6. The image processing apparatus according to claim 5, wherein
   the predetermined function is a function that represents a minimum luminance difference that a human can discriminate.

7. The image processing apparatus according to claim 5, wherein
   the predetermined function is a function that represents a minimum luminance difference that can be reproduced in an image output device that processes the output image.

8. The image processing apparatus according to claim 1, wherein
a tone characteristic of the input image is based on a tone characteristic of an image capturing apparatus that generates the input image.

9. The image processing apparatus according to claim 1, wherein the instructions, when executed by the at least one processor, further cause convert the input image into the output image based on the tone-conversion characteristic.

10. An image processing method that decides a tone-conversion characteristic for converting an M level input image into an N level output image (where M>N), the method comprising:
deciding a maximum d (where d is a positive integer) at which a difference between a luminance value Y(i) corresponding to an ith level of the input image and a luminance value Y(i+d) corresponding to an (i+d)th level does not exceed a given threshold; and
based on the decided maximum d, setting the tone-conversion characteristic so that the ith level and the (i+d)th level of the input image respectively correspond to a jth level and a (j+1)th level of the output image.

11. An image processing method that decides a tone-conversion characteristic for converting an M level input image into an N level output image (where M>N), the method comprising:
in a luminance range of luminances smaller than a predetermined luminance threshold, setting the tone-conversion characteristic so that an ith level and an (i+1)th level of the input image respectively correspond to a jth level and a (j+1)th level of the output image; and
in a luminance range of luminances greater than or equal to the predetermined luminance threshold, deciding a maximum d (where d is a positive integer) at which a difference between a luminance value Y(i) corresponding to an ith level of the input image and a luminance value Y(i+d) corresponding to an (i+d)th level does not exceed a given threshold, and setting the tone-conversion characteristic so that the ith level and the (i+d)th level of the input image respectively correspond to a jth level and a (j+1)th level of the output image.

12. A non-transitory computer-readable recording medium storing a program that causes a computer to function as an image processing apparatus that decides a tone-conversion characteristic for converting an M level input image into an N tone output image (where M>N), wherein the program causes the computer to:
decide a maximum d (where d is a positive integer) at which a difference between a luminance value Y(i) corresponding to an ith level of the input image and a luminance value Y(i+d) corresponding to an (i+d)th level does not exceed a given threshold; and
based on the decided maximum d, set the tone-conversion characteristic so that the ith level and the (i+d)th level of the input image respectively correspond to a jth level and a (j+1)th level of the output image.

* * * * *